US006906664B2

(12) United States Patent
Tseng et al.

(10) Patent No.: US 6,906,664 B2
(45) Date of Patent: *Jun. 14, 2005

(54) METHOD AND SYSTEM USING A GPS-BASED PHASED-ARRAY SCHEME FOR THREE-AXIS ATTITUDE DETERMINATION

(75) Inventors: Gan-Tai Tseng, Rancho Palos Verdes, CA (US); Philip Roger Dahl, Encino, CA (US); Shih-Chieh Leung, Cerritos, CA (US); James Chun-Hsiang Liau, Hacienda Heights, CA (US); Jo-Lien Yang, Palos Verdes Estates, CA (US); Michael Shigeru Yonezaki, Torrance, CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/266,478

(22) Filed: Oct. 8, 2002

(65) Prior Publication Data

US 2003/0048221 A1 Mar. 13, 2003

(51) Int. Cl.[7] ................................................. G01S 5/14
(52) U.S. Cl. .................................................. 342/357.11
(58) Field of Search ........................... 342/357.11, 427, 342/154, 425, 424

(56) References Cited

U.S. PATENT DOCUMENTS

| | | | | |
|---|---|---|---|---|
| 3,719,949 A | * | 3/1973 | Hemmi | 342/424 |
| 5,790,071 A | * | 8/1998 | Silverstein et al. | 342/354 |
| 5,940,026 A | * | 8/1999 | Popeck | 342/357.01 |
| 6,018,315 A | * | 1/2000 | Ince et al. | 342/357.11 |
| 6,128,557 A | | 10/2000 | Fenton et al. | |
| 6,259,398 B1 | * | 7/2001 | Riley | 342/357.04 |
| 6,452,543 B1 | | 9/2002 | Tseng et al. | |
| 6,456,238 B1 | * | 9/2002 | Posey | 342/427 |
| 6,459,406 B1 | | 10/2002 | Tseng et al. | |
| 6,598,009 B2 | * | 7/2003 | Yang | 702/152 |

FOREIGN PATENT DOCUMENTS

WO    WO 00/22452 A1  *  4/2000   ............. G01S/5/02

OTHER PUBLICATIONS

Axelrad, Penina et al, "Satellite Attitude Determination Based on Signal-to-Noise Ratio," Proc. of the IEEE vol. 87, No. 1, Jan. 1999, pp. 133–144.*
Crassidis, John et al, "Applications of Vectorized Attitude Determination USing Global Positioning System Signals," American Institute of Aeronautics and Astronaautics, A1AA–98–4390, 1998, pp. 1–10.*
Serrano, Jestis et al, "A New Spacecraft Attitude Determination Scheme Based on the Use of GPS Line–of Sight Vectors," Journal –Proc. ION–GPS–95, pp 1797–1806.*
Axelrad, Penina et al, "Satellite Attitude Determination Based on GPS Signal–to–Noise Ratio" Proceedings of the IEEE, vol. 87, No. Jan. 1, 1999, pp. 133–144 plus 4 pages of references cited therewith.*

* cited by examiner

*Primary Examiner*—Gregory C. Issing
(74) *Attorney, Agent, or Firm*—Henricks, Slavin & Holmes LLP

(57) ABSTRACT

A method and system for determining three-axis attitude from line-of-sight (LOS) solutions for two or more GPS satellites uses intersections of null cone patterns and LOS vectors to the GPS satellites. In a preferred embodiment, a unified GPS-based sensor also provides navigation information.

19 Claims, 6 Drawing Sheets

METHOD AND SYSTEM USING A GPS-BASED PHASED-ARRAY SCHEME FOR THREE-AXIS ATTITUDE DETERMINATION

BACKGROUND OF THE INVENTION

Three-axis attitude determination systems for current space and launch vehicles use separate sensor suites involving different combinations of expensive units (earth sensor, sun sensor, gyro, star tracker, etc.) for spinning or non-spinning applications. For example, the spin axis attitude determination of a spinning space vehicle has been traditionally accomplished by using a combination of sun and earth horizon sensors. A sun sensor measures the sun illumination spike and the elevation angle with respect to the spin axis of the space vehicle. Sun position and elevation information establishes a geometric sun position cone with a half cone angle equal to the elevation angle on which the spin axis lies. A similar earth elevation cone can be constructed based on the earth sensor measurements. The intersection of the sun position cone and earth elevation cone provide the inertial attitude information for determining the spin axis of the rotating vehicle. The cost of such a system can be appreciable. It is desirable to find cost effective alternatives to the use of expensive sun and horizon sensors.

Some researchers have pursued three-axis attitude determination, using GPS (Global Positioning System), based on interferrometry of a spatially separated multi-patch antenna system for inertially stationary platforms. A major disadvantage of this interferrometric approach is the requirement of large antenna baselines. This requirement makes the product bulky and heavy. Moreover, it cannot be used on a spinning system. Accordingly, it would also be desirable to find alternative products that are small, light, and power efficient. Furthermore, it would be desirable to provide a single attitude and navigation sensor for both spinning and non-spinning systems, e.g., for land, marine, airborne, and space applications. Potentially, such a unified GPS-based sensor would provide significant size, weight, power, and/or cost advantages.

BRIEF DESCRIPTION OF THE DRAWINGS

Detailed description of embodiments of the invention will be made with reference to the accompanying drawings.

DETAILED DESCRIPTION

The following is a detailed description of the best presently known mode of carrying out the invention. This description is not to be taken in a limiting sense, but is made merely for the purpose of illustrating the general principles of the invention.

Generally, the three-axis attitude determination method and system of the present invention are based upon exploitation of electronic scans of antenna pattern nulls using closely spaced antennas. This allows the product to be very small, light, and power efficient. A unified GPS-based sensor, according to various embodiments of the present invention, provides the potential for significant size, weight, power, and/or cost advantages. For example, an embodiment of the present invention employs a single attitude and navigation sensor. Various embodiments of the present invention are suitable for both spinning and non-spinning systems for land, marine, airborne, and/or space applications.

According to the present invention, an active planar phased-array scheme is employed to electronically slew two pattern nulls created by four antennas to obtain three-axis attitude information of the user vehicle with two or more GPS satellites in view. In addition to attitude data, navigation information is also available from the GPS receiver.

Figure 1:
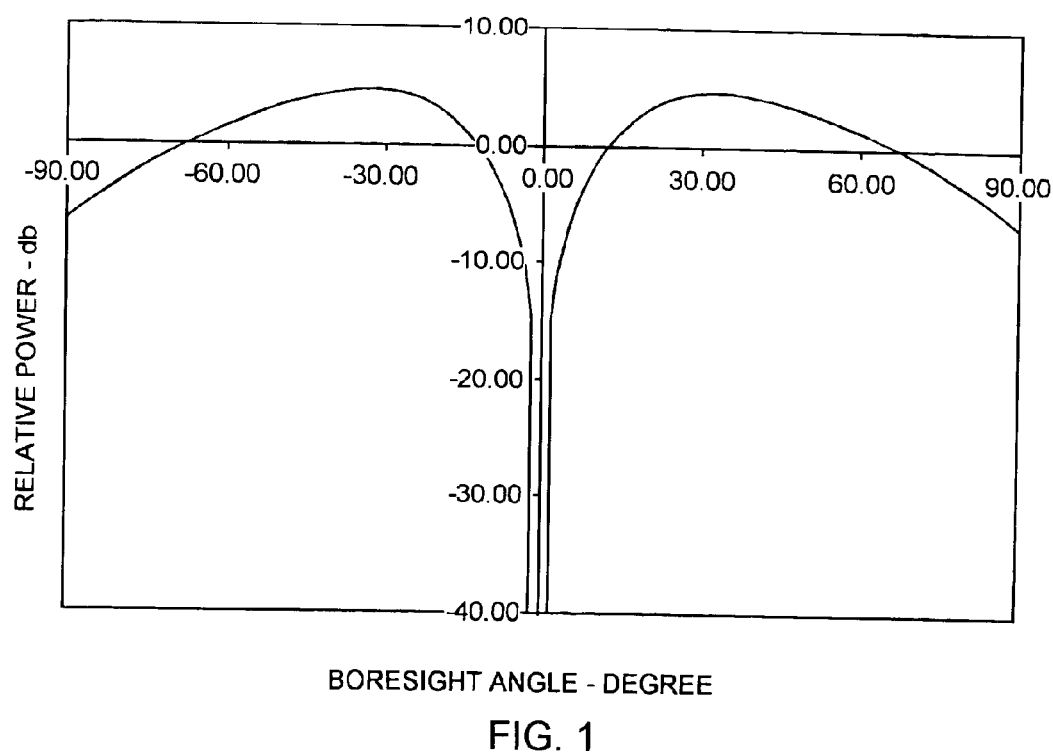
FIG. 1 is a plot of an antenna null pattern which encompasses the axis of the array and is perpendicular to the ground plane.
Figure 1A:
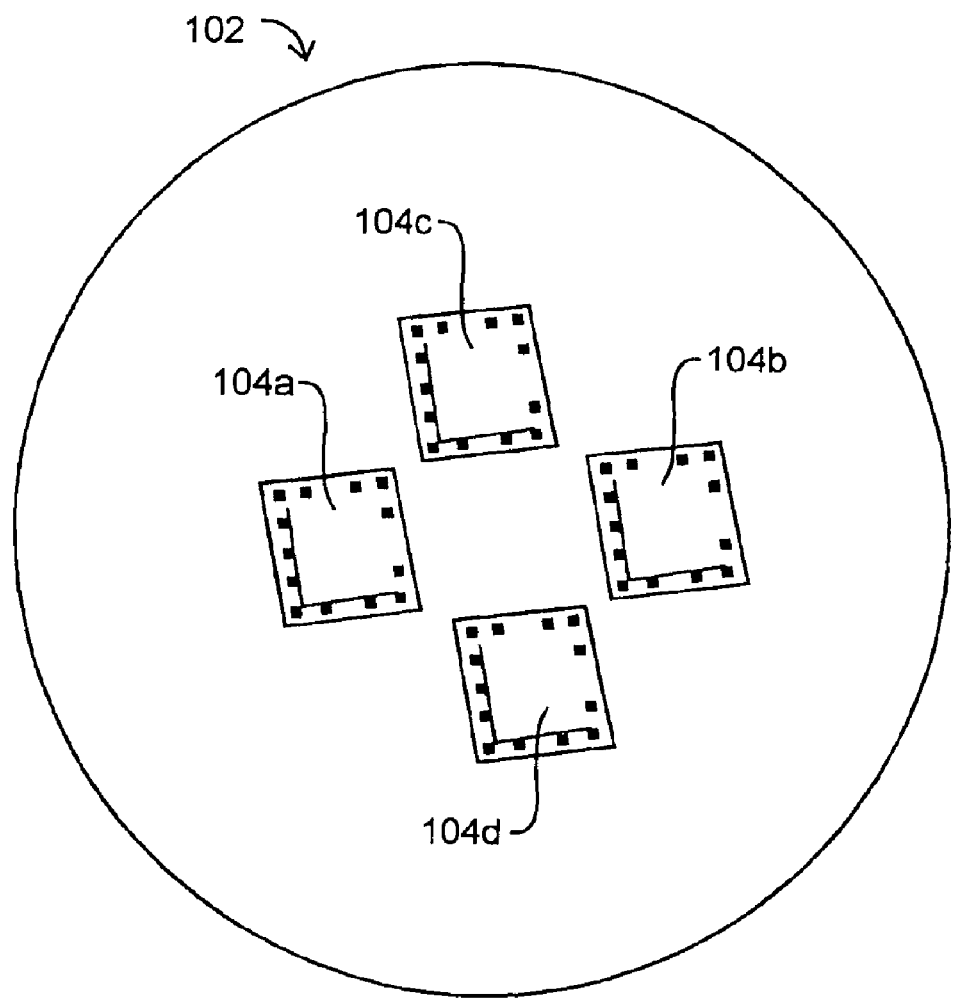
FIG. 1A shows an exemplary patch antenna configuration.
Figure 3:
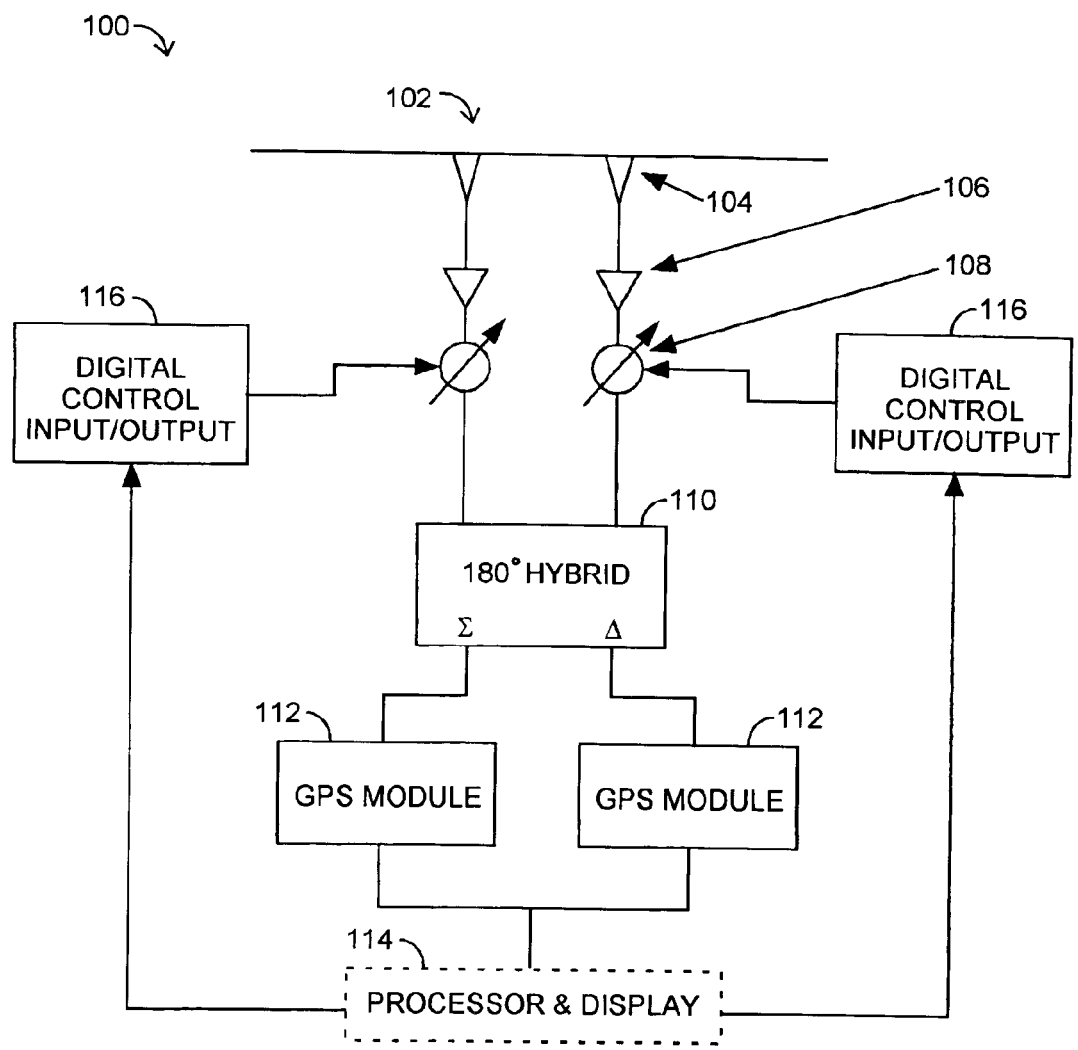
FIG. 3 is a block diagram of a sensor system according to an exemplary embodiment of the present invention.

Referring to FIGS. 1, 1A and 3, a sensor system 100 according to the present invention includes an antenna system 102. An exemplary antenna system 102 comprises four patch antennas 104a, 104b, 104c, and 104d (only two of the four antennas are shown in FIG. 3), low noise amplifiers/filters 106, phase shifters 108 and a 180-degree phase shifter using, for example, a 180-degree hybrid 110 (a conventional sum and difference hybrid) configured as shown. By introducing a 180-degree phase shift between two adjacent antennas, a "null" is created in a plane perpendicular to FIG. 1 at the zero antenna-phase-center boresight angle. The difference pattern shown in FIG. 1 is used to track carrier-to-noise ratio (C/No) of individual GPS satellites.

The pair of patch antennas 104a and 104b each create a hemispherical antenna pattern (as do the pair of patch antennas 104c and 104d). With the two patch antennas of the pair placed closely to each other, the two hemispherical antenna patterns are combined using the hybrid 110. A null pattern is created by placing two antenna elements side-by-side with the hemispherical patterns overlapping so that when subtracted from each other using the hybrid 110, the hemispherical pattern of one patch antenna is shifted out of phase and then added to the other hemispherical pattern of the other patch antenna producing a narrow null at the center plane position of the difference pattern. The null of the difference pattern is aligned to a peak of a sum pattern. The null is created in the difference pattern to provide a time reference. The sum beam pattern is created from the sum of the two hemispherical patterns of the two patch antennas. The sum pattern can be used to detect the presence of GPS satellites transmitting GPS radio frequencies (RF) signals as the difference null pattern is used as a time reference. The beamwidths of the sum and difference patterns depend on the placement and pattern shape of the two patch antennas. Both the sum and the null difference antenna patterns created by the hybrid 110 and patch antennas 104a and 104b are used to receive GPS signals.

At GPS RF frequencies, a practical choice of patch antenna is the quarter wave patch antenna. The patch antenna could be, among other choices, made of a four square inch conductive plate disposed over a dielectric disposed over a ground plate for providing reception of GPS signals having a wavelength of about eight inches. The size of the conducting plate and the dielectric constant are chosen to form the ¼ wave patch antenna. The ¼ wave patch antenna has a hemispherical antenna pattern for acquisition of the GPS RF signals. The four ¼ wave patch antennas then provide signals to the hybrid for generating the sum and difference patterns. The difference pattern provides the null for time correlation to the sum signals. The ideal null pattern has a rectangular notch shape across all elevation angles.

While larger spacing between the antennas is better for producing a null and negating mutual coupling, smaller spacing is needed to eliminate grating lobes. Those skilled in the art are capable of designing antenna sum and difference patterns respectively having a suitable sum beam and difference null.

The exemplary sensor system 100 also includes a GPS receiver suite 112, a processor and display unit 114 and a digital control input/output module 116, which are configured as shown with the antenna system 102. As discussed above, the received signal from each antenna is either added or subtracted from each other. The added signals are output at the sum port of the hybrid 110 while the subtracted signals are output at the difference port. The 180° hybrid 110 provides the 180-degree phase shift at the operating frequencies, which invert the signal for subtraction and coherently combine the signals. The sum ($\Sigma$) and difference ($\Delta$) gains are then passed on to the GPS modules (receivers) 112 for C/No measurements and navigation solution.

Figure 2:
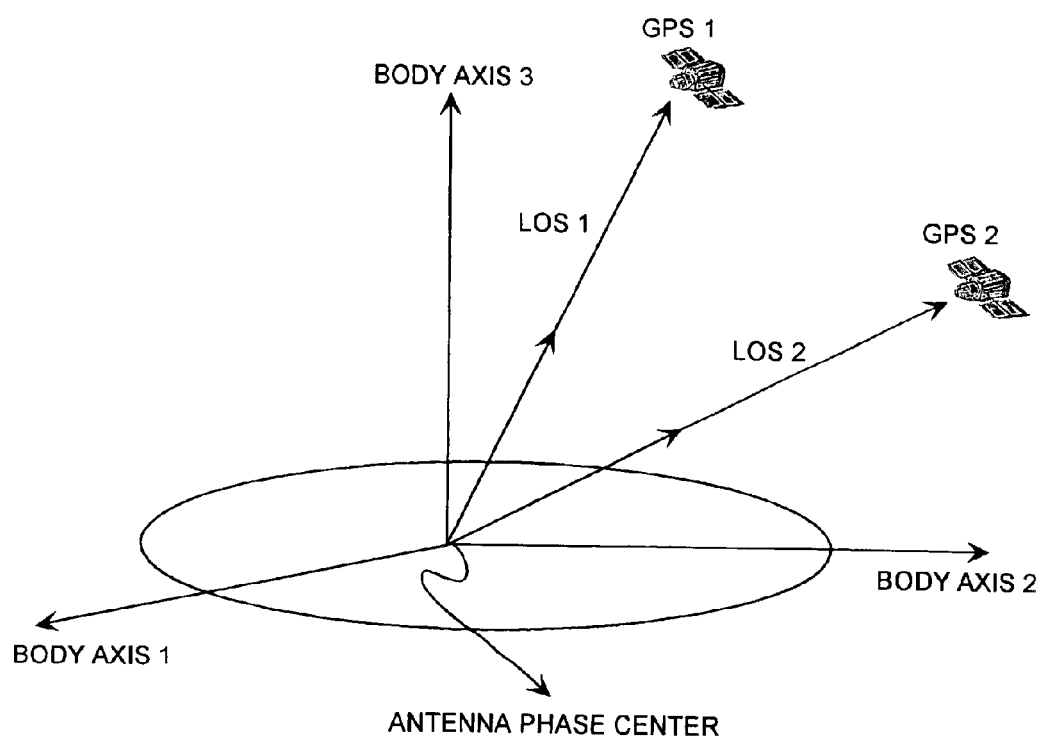
FIG. 2 illustrates an exemplary operating environment for the method and system of the present invention including line-of-sight (LOS) Vectors from the antenna phase center to GPS satellites.
Figure 4:
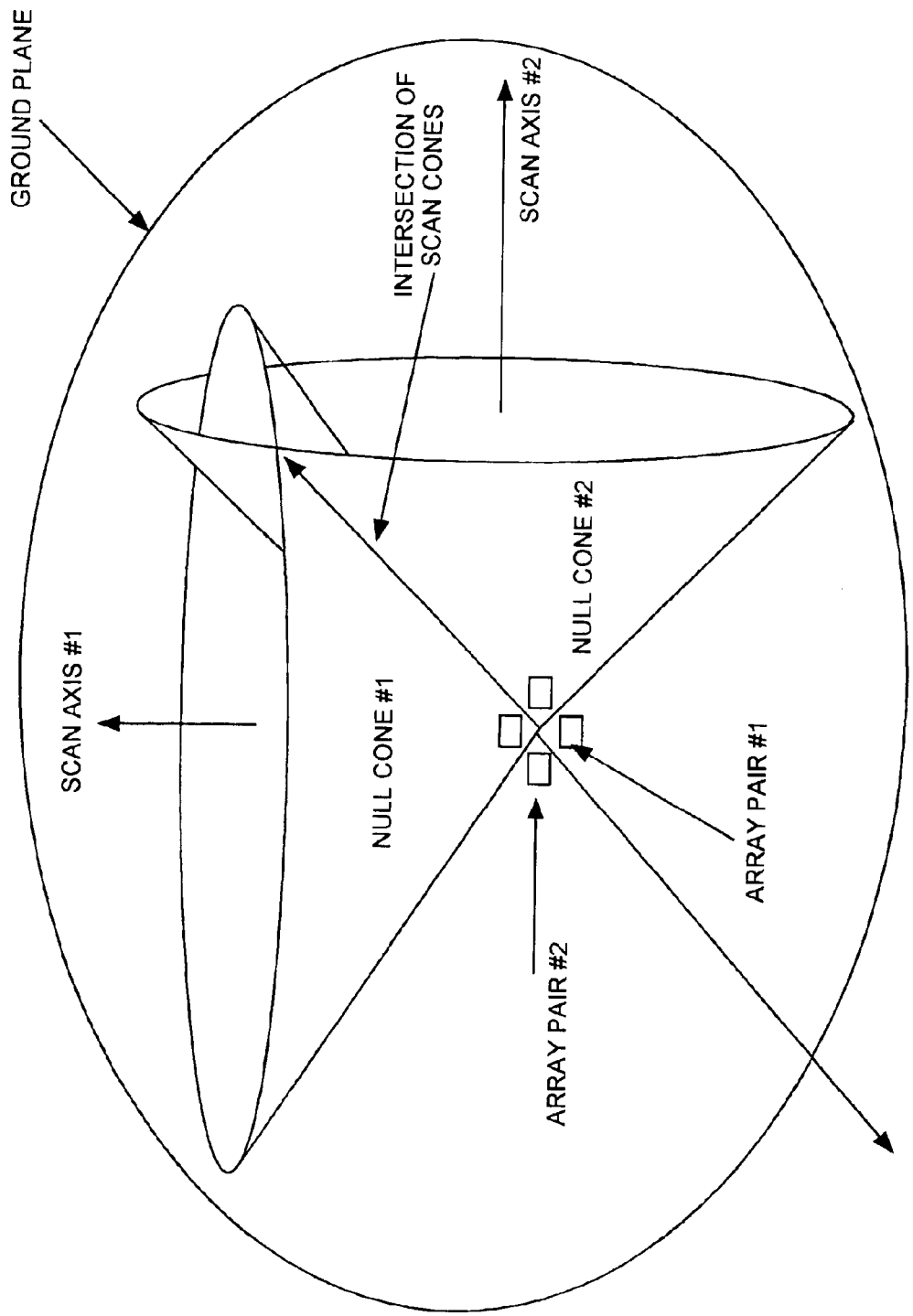
FIG. 4 shows two sample null cones.

In contrast with conventional sun/earth/star detection, a line-of-sight (LOS) vector from the user vehicle to a GPS satellite (FIG. 2) is established when its C/No signal drops below the detection threshold, i.e., detection by becoming non-detectable. The four antenna elements forming a planar phased-array 104a, 104b, 104c, and 104d are used to create two mutually perpendicular null planes. Each null plane gradually warps into a cone under electronic scan with the cone angle as a function of the input phase shift voltage. Two sample null cones are shown in FIG. 4. When a GPS satellite changes from being detectable to undetectable at a certain cone angle, it indicates that the LOS from the user vehicle to the GPS satellite is now on the surface of that cone.

The carrier-to-noise ratio (C/No) is the measure of signal quality throughout the receiver and is related to the noise figure of the receiver. "C" is the post-correlation signal power and can vary due to multipath, cross-correlation, ionospheric scintillation, blockage, etc. However, "C" does not vary due to interference and noise. It is usually given in watts, or dBW if defined using logarithms. "No" is noise density. It is typically post-correlation noise density because of code spreading in the correlator of the receiver. "No" is usually given in watts/Hz, or dbW/Hz if defined using logarithms. For a typical receiver with a known noise figure, C/No is directly proportional to the satellite signal strength. Thus, C/No can be used to detect and determine the direction of the LOS vector to a GPS satellite.

The receiver 112 contains computer programs with embedded algorithms for GPS signal detection and navigation solution computations. The GPS receiver 112 may include an RF processor and a correlator and tracking loops, all not shown, but well-known conventional receiver components. The RF processor performs down conversion of the GPS signals for baseband processing. The resultant downconverted signal is then correlated by the correlator with an internally generated replica of the GPS satellite chipping code of the received signal. The receiver 112 controls the signal tracking loops for correlating the received GPS signals. The downconverted and correlated signals are then used to compute the navigation solution. The difference GPS signals are also received by the receiver 112 from the hybrid 110.

The navigation solution is computed by the receiver 112 once satellite pseudoranges and delta pseudoranges are determined in the tracking loop. The pseudorange, determined by the receiver 112, is the range between a tracked satellite and user vehicle. The delta pseudorange is the change in pseudorange due to the relative velocity of the user vehicle with respect to the satellite it is tracking. A typical navigation solution provides the position and velocity for the user vehicle in Earth Centered Earth Fixed (ECEF) coordinates and can be transformed to other reference frames. As the position and velocity solutions are derived for the antenna phase center, it should be appreciated however that the antenna elements can be, but are not necessarily, collocated with a user vehicle (if any). Moreover, the antenna elements and the receiver can be, but are not necessarily, collocated. The outputs of the receiver 112 including C/No and navigation solutions are then channeled to the processor and display unit 114 for three-axis attitude and heading/leveling computations and display, as discussed below. The digital control I/O module 116 serves as the interface between the processor/display unit 114 and the antenna system 102. It also provides the proper drive signal to the phase shifter 108 to control the scan of the nulls. The null is steered by changing the phase difference between the antennas. This is accomplished with the analog phase shifter 108 where the phase change is proportional to an input voltage signal. Depending upon the sign of the phase change, the null will move on either side of a plane perpendicular to the axis of the array.

Figure 5:
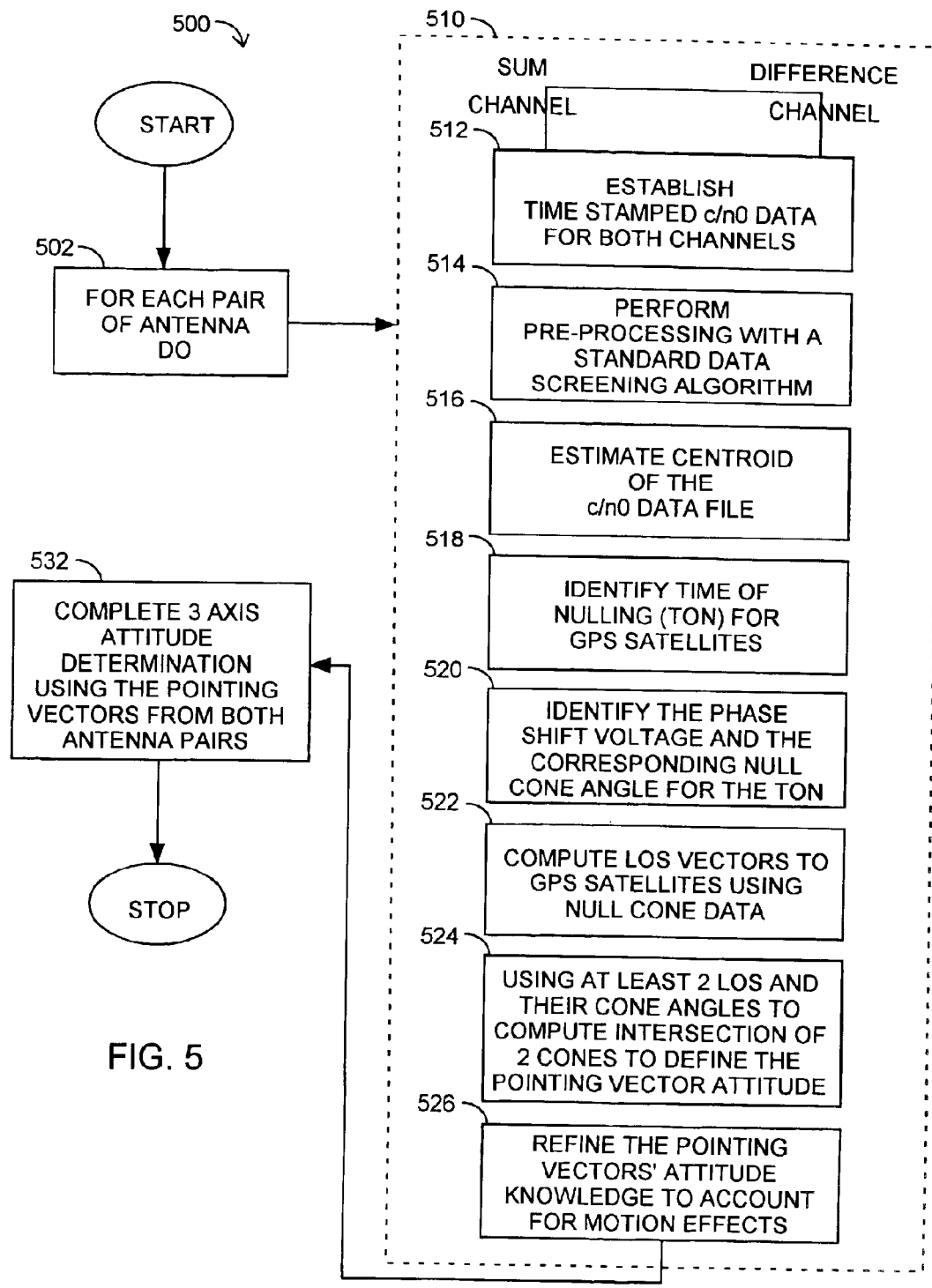
FIG. 5 is a flow chart of a three-axis attitude determination process according to an exemplary embodiment of the present invention.

Referring to FIG. 5, software components of the present invention (data processing, LOS calculation and three-axis attitude determination, etc.) are now discussed. According to an exemplary three-axis attitude determination process 500, for each pair of antennas, a two patch processing routine 510 is employed and the sum and difference gains are first computed from the sum and difference channels. The next step 512 is to time-stamp the C/No data for each channel followed by pre-processing 514 the time-stamped data with a standard data screening and smoothing algorithm. With bad data points discarded after the screening and smoothing process 514, estimation techniques are applied at step 516 to locate the centroid of the C/No null. Once the centroiding task 516 is complete, at step 518, the time of nulling (TON) is established in GPS time. At step 520, with the voltage reading of the scan drive at TON, the corresponding null cone angle can be determined. At step 522, LOS vectors to GPS satellites are computed at TON. The LOS vector to the GPS satellite lies on the surface of this null cone ($\alpha$). One can imagine that the symmetry axis of $\alpha$ lies on the surface of a fictitious cone ($\beta$) of the same cone angle as $\alpha$ but with the LOS as its symmetry axis. A second $\beta$ is created by the same scan for a second GPS satellite. At step 524, the interaction of these two $\beta$'s gives the inertial attitudes of the axis of Cone $\alpha$, which is a body-fixed pointing vector of interest. Any ambiguity on the solutions of the cone interaction can be resolved by recognizing that only half of the null cone above the ground plane is physically realizable or by including more GPS satellites. Repeating the same process using the other pair of antenna patches generates the inertial attitude knowledge for the perpendicular axis, which is a second body-fixed pointing vector of interest. At step 526, errors in the LOS determination due to the motion of the GPS satellites and the user vehicle (if moving) are compensated to improve the attitude knowledge accuracy of the two pointing vectors. At step 532, determination of the attitude of the third axis is determined using the attitude knowledge of two mutually perpendicular and body-fixed pointing vectors. Considering the large number of GPS satellites already in orbit and the prospect of even more in the future, the requirement of having at least two GPS satellites in view should be easily satisfied.

In summary, the sensor system of the present invention can be made as a very small stand-alone unit for, or as an add-on/plug-in to, large (e.g., car, aircraft, boat, launch vehicle, spacecraft) or small (e.g., laptop, Palm, cell phone) mobile systems for three-axis/spin-axis/heading/leveling determination and navigation.

The system configuration described above can be varied. By way of example, variations can include more or less than four antenna patches, more or less than two GPS receivers, with or without using the summing channel, etc, for certain applications.

Although the present invention has been described in terms of the embodiment(s) above, numerous modifications and/or additions/reductions to the above-described embodiment(s) would be readily apparent to one skilled in the art. It is intended that the scope of the present invention extends to all such modifications and/or additions/reductions.

We claim:

1. A method for three-axis attitude determination, comprising the steps of:
    using a first one-dimensional two-antenna array to create a flat null plane;
    transforming the flat null plane into a conical null surface under electronic scan;
    sweeping the conical null surface to construct two or more virtual cones about line-of-sight (LOS) vectors to two or more GPS satellites;
    determining a first body-fixed pointing vector from an intersection of the virtual cones;
    determining a second body-fixed pointing vector perpendicular to the first body-fixed pointing vector using a second one-dimensional two-antenna array; and
    determining three-axis attitude from the first and second body-fixed pointing vectors.

2. The method for three-axis attitude determination of claim 1, further comprising the step of:
    establishing the LOS vectors from the antenna arrays to the two or more GPS satellites when levels of signal strength from the GPS satellites drop below a detection threshold.

3. A method for three-axis attitude determination, comprising the steps of:
    providing a plurality of antennas;
    using combinations of the antennas to generate a plurality of conical null patterns;
    using the conical null patterns to construct virtual cones about line-of-sight (LOS) vectors from the antennas to two or more satellites, the LOS vectors being established when levels of signal strength from the satellites drop below a detection threshold;
    using antenna position and satellite ephemeris to determine LOS solutions for the LOS vectors for the two or more satellites; and
    determining heading, pointing and three-axis attitudes from intersections of the virtual cones.

4. The method for three-axis attitude determination of claim 3, wherein the plurality of antennas comprise one-dimensional two-antenna arrays.

5. The method for three-axis attitude determination of claim 3, wherein the combinations of the antennas are orthogonal to each other.

6. The method for three-axis attitude determination of claim 3, further comprising the step of:
    refining attitude knowledge associated with the LOS solutions to account for motion effects.

7. A sensor system for three-axis attitude determination, comprising:
    an antenna system including a plurality of antennas, the antenna system being configured to generate, for pairs of the antennas, sum and difference gains;
    a Global Positioning System (GPS) receiver configured to receive the sum and difference gains and to generate carrier-to-noise (C/No) measurements and navigation information;
    a processor configured to receive the carrier-to-noise (C/No) measurements and the navigation information and to generate three-axis attitude information from pointing vector attitudes determined from intersections of virtual cones; and
    a digital input/output controller configured to provide an interface between the antenna system and the processor and to control the antenna system to slew antenna pattern nulls for each of the pairs of antennas to construct the virtual cones about line-of-sight (LOS) vectors to GPS satellites.

8. The sensor system for three-axis attitude determination of claim 7, wherein the antennas comprise four patch antennas.

9. The sensor system for three-axis attitude determination of claim 7, wherein the GPS receiver is configured such that the navigation information includes a position and/or velocity of the antennas.

10. The sensor system for three-axis attitude determination of claim 7, wherein the system is configured to time-stamp C/No data for sum and difference channels.

11. The sensor system for three-axis attitude determination of claim 10, wherein the system is configured to pre-process the time-stamped data with a data screening and smoothing algorithm.

12. The sensor system for three-axis attitude determination of claim 7, wherein the system is configured to apply an estimation technique to locate a centroid of a C/No null.

13. The sensor system for three-axis attitude determination of claim 7, wherein the system is configured to identify a time of nulling (TON) for GPS satellites becoming undetectable.

14. The sensor system for three-axis attitude determination of claim 13, wherein the system is configured to determine a corresponding null cone angle for the TON.

15. The sensor system for three-axis attitude determination of claim 7, wherein the system is configured to define pointing vector attitudes for each of the pairs of antennas.

16. The sensor system for three-axis attitude determination of claim 7, wherein the system is configured to compensate for errors in LOS determinations due to motion of the GPS satellites and the antennas, if moving relative to the earth.

17. An antenna system for three-axis attitude determination, comprising:
    four antennas arranged relative to each other as orthogonal pairs; and
    electronics configured for utilizing the antennas to create two mutually perpendicular null planes, to scan the null planes into null cones, and to sweep the null cones to construct virtual cones about line-of-sight (LOS) vectors to satellites, and for determining three-axis attitude from intersections of the virtual cones.

18. The antenna system for three-axis attitude determination of claim 17, wherein the antennas comprise patch antennas.

19. The antenna system for three-axis attitude determination of claim 17, wherein the antennas comprise one quarter wave patch antennas.

* * * * *